(12) United States Patent
Matsushita et al.

(10) Patent No.: US 12,184,079 B2
(45) Date of Patent: Dec. 31, 2024

(54) WIRELESS POWER SUPPLY SYSTEM

(71) Applicant: OMRON Corporation, Kyoto (JP)

(72) Inventors: Katsumi Matsushita, Kyoto (JP); Hiroyuki Mino, Kyoto (JP); Atsushi Nomura, Kyoto (JP); Takuto Ohzawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 64 days.

(21) Appl. No.: 18/106,946

(22) Filed: Feb. 7, 2023

(65) Prior Publication Data
US 2023/0275461 A1 Aug. 31, 2023

(30) Foreign Application Priority Data
Feb. 28, 2022 (JP) .................................. 2022-030284

(51) Int. Cl.
*H02J 50/00* (2016.01)
*H02J 50/10* (2016.01)
(52) U.S. Cl.
CPC ............ *H02J 50/005* (2020.01); *H02J 50/10* (2016.02)
(58) Field of Classification Search
CPC ........ H02J 50/005; H02J 50/10; H02J 7/0042; H02J 7/0044; H02J 50/12; H02J 50/90
See application file for complete search history.

(56) References Cited

U.S. PATENT DOCUMENTS

2014/0354223 A1* 12/2014 Lee ......................... H02J 50/12
320/108
2021/0384745 A1* 12/2021 Wang .................... H02J 7/0044

FOREIGN PATENT DOCUMENTS

JP 2017-158275 A 9/2017
WO WO-2014104426 A1 * 7/2014 .............. H02J 17/00

* cited by examiner

*Primary Examiner* — Jung Kim
(74) *Attorney, Agent, or Firm* — SHINJYU GLOBAL IP (57) ABSTRACT

A wireless power supply system supplies power to an electrical device by wireless power supply. The electrical device is equipped with a power receiving unit including a power receiving coil. The wireless power supply system includes a flat surface, a power transmitting unit, and a standing portion. The electrical device is placed on the flat surface. The power transmitting unit includes a power transmitting coil disposed below the flat surface. The power transmitting unit supplies power to the power receiving unit by the wireless power supply. The standing portion defines, on the flat surface, a boundary between the outside and the inside of a placement area for the electrical device for supplying power from the power transmitting unit to the power receiving unit by the wireless power supply. The standing portion protrudes from the flat surface.

14 Claims, 7 Drawing Sheets

FIG. 7

WIRELESS POWER SUPPLY SYSTEM

CROSS-REFERENCE TO RELATED APPLICATION

This application claims priority to Japanese Patent Application No. 2022-30284, filed Feb. 28, 2022. The contents of that application are incorporated by reference herein in their entirety.

FIELD

The present invention relates to a wireless power supply system.

BACKGROUND

A technology for supplying electric power to an electric device by wireless power supply has been conventionally known. For example, in JP-A-2017-158275, a power supply table is mounted on a kitchen table. The power supply table has a power transmission coil embedded therein. When an electrical device is placed on the power supply table, a power transmission coil and a power receiving coil are electromagnetically coupled with each other so that power is supplied to the electrical device.

SUMMARY

In the above-described wireless power supply technology, if the power receiving coil is significantly separated from the power transmission coil, the efficiency of power transmission to the electrical device decreases. For this reason, for example, the table has a line thereon to visibly show the position of the power transmission coil, so that a user grasps the position where the electrical device should be placed.

However, it is not easy for users to place an electrical device with accurate alignment between the positions of the power transmission coil and the power receiving coil. In a case where the deviation between the power receiving coil and the power transmission coil is small, sufficient power is securely transmitted therebetween sometimes, but it is not easy for users to know how far the power receiving coil can be deviated from the power transmission coil while assuring a sufficient efficiency of power transmission therebetween. An object of the present invention is to provide a wireless power supply system that enables sufficient efficiency of power transmission between an electrical device and a power transmission coil without strict alignment between them by a user.

A wireless power supply system according to one aspect of the present invention is configured to supply power to an electrical device by wireless power supply. The electrical device is equipped with a power receiving unit including a power receiving coil. The wireless power supply system includes a flat surface, a power transmitting unit, and a standing portion. The electrical device is placed on the flat surface. The power transmission unit includes a power transmission coil disposed below the flat surface. The power transmission unit is configured to supply power to the power receiving unit by the wireless power supply. The standing portion defines, on the flat surface, a boundary between an outside and an inside of a placement area for the electrical device for supplying power from the power transmitting unit to the power receiving unit by the wireless power supply. The standing portion protrudes from the flat surface.

In the wireless power supply system of the present aspect, the standing portion defines the boundary between the outside and the inside of the placement area for the electrical device for the wireless power supply. Thus, compared to the case where the position of the power transmission coil is illustrated, the user can easily grasp the area to place the electrical device. In addition, the standing portion protrudes from the flat surface. Accordingly, if the electrical device is not placed appropriately within the placement area for the electrical device, the standing portion raises the electrical device above the flat surface. As such, the user can easily perceive whether the electrical device is appropriately placed within the placement area for the electrical device. As a result, sufficient efficiency of power transmission is ensured without requiring the user for strict alignment between the electrical device and the power transmission coil.

The standing portion may surround the power transmission coil on the flat surface. In this case, in view of an allowable positional deviation of the power receiving coil with respect to the position of the power transmission coil, the standing portion is disposed to be wider than the power transmission coil. Thereby, a user can easily place the electrical device within the placement area where sufficient efficiency of power transmission is ensured.

The standing portion may be disposed, on the flat surface, outside a placement allowable area for the power receiving coil for supplying power from the power transmitting unit to the power receiving unit by the wireless power supply. In this case, in view of the external size of the electrical device larger than the power receiving coil, the standing portion is arranged outside the placement allowable area for the power receiving coil. Thereby, the user can easily place the electrical device within the placement area where sufficient efficiency of power transmission is ensured.

While the power receiving coil is placed within the placement allowable area, power transmission from the power transmitting unit to the power receiving unit may be at or above a predetermined threshold. In this case, sufficient efficiency of power transmission equal to or higher than the predetermined threshold value is secured when a user places the electrical device inside the standing portion.

A distance between the standing portion and the placement allowable area for the power receiving coil is determined based on an external size of the electrical device. In this case, with the electrical device at any position inside the standing portion, the power receiving coil is placed within the placement allowable area. Thereby, the user can easily place the electrical device within the placement area where sufficient efficiency of power transmission is ensured.

The flat surface may include a power supply surface and a main surface. The power supply surface may be positioned inside the standing portion. The main surface may be arranged outside the standing portion. The power supply surface may be integral with the main surface. In this case, the power supply surface and the main surface are easily formed.

The standing portion may be integral with the flat surface. In this case, the standing portion is easily formed.

The flat surface may be mounted on a kitchen countertop. In this case, the electrical device can be easily used or charged on the kitchen countertop without obstructive power cable. Therefore, it can increase comfort of a user who uses the electrical device in the kitchen.

A wireless power supply system according to another aspect of the invention includes an electrical device, a flat surface, a power transmitting unit, and a standing portion.

The electrical device is equipped with a power receiving unit including a power receiving coil. The electrical device is placed on the flat surface. The power transmitting unit includes a power transmission coil disposed below the flat surface. The power transmitting unit is configured to supply power to the power receiving unit by wireless power supply. The standing portion, on the flat surface, defines a boundary between an outside and an inside of a placement area for the electrical device for supplying power from the power transmitting unit to the power receiving unit by the wireless power supply. The standing portion protrudes from the flat surface.

In the wireless power supply system of the present aspect, the standing portion defines the boundary between the outside and the inside of the placement area for the electrical device for the wireless power supply. Thus, compared to the case where the position of the power transmission coil is illustrated, the user can easily grasp the area to place the electrical device. In addition, the standing portion protrudes from the flat surface. Accordingly, if the electrical device is not placed appropriately within the placement area for the electrical device, the standing portion raises the electrical device above the flat surface. As such, the user can easily perceive whether the electrical device is appropriately placed within the placement area for the electrical device. As a result, sufficient efficiency of power transmission is ensured without requiring the user for strict alignment between the electrical device and the power transmission coil.

According to the present invention, in a wireless power supply system, sufficient efficiency of power transmission is ensured without requiring the user for strict alignment between the electrical device and the power transmission coil.

DETAILED DESCRIPTION

Figure 1:
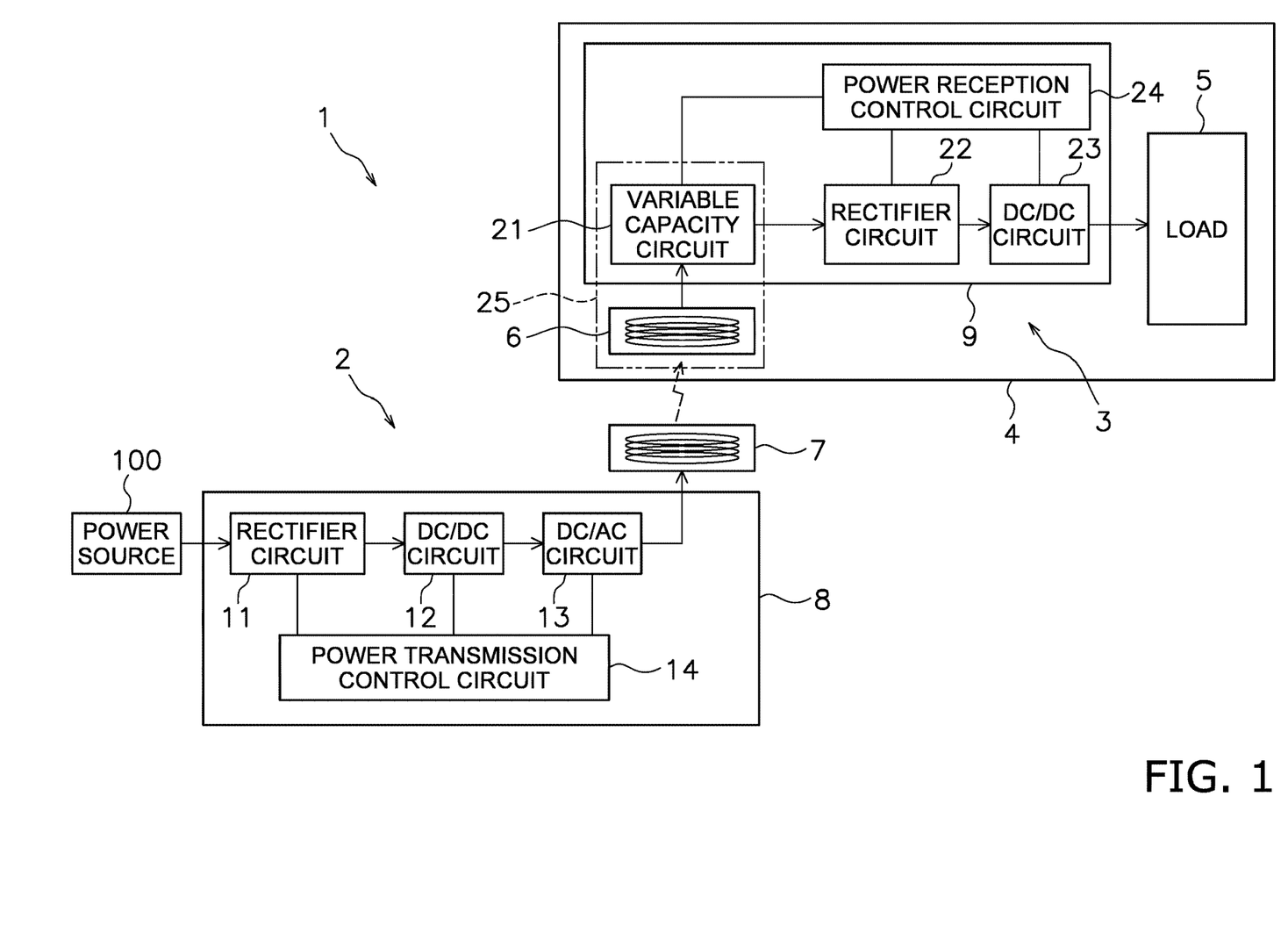
FIG. 1 is a schematic diagram showing a circuit configuration of a wireless power supply system.

A wireless power supply system according to an embodiment will be described below with reference to the drawings. FIG. 1 is a schematic diagram showing a circuit configuration of a wireless power supply system 1. As shown in FIG. 1, the wireless power supply system 1 includes a power transmitting unit 2, a power receiving unit 3 and an electrical device 4. The power receiving unit 3 is mounted in the electrical device 4. The electrical device 4 includes a load 5 such as a motor, a heater, or a battery.

The power receiving unit 3 includes a power receiving coil 6. The power transmitting unit 2 includes a power transmission coil 7. The power receiving coil 6 electromagnetically couples with the power transmission coil 7, so that the power receiving unit 3 receives power from the power transmitting unit 2 by wireless power supply. The power receiving unit 3 supplies the power received from the power transmitting unit 2 to the load 5.

The power transmitting unit 2 includes a power transmission control unit 8. The power transmission control unit 8 is connected to the power transmission coil 7. The power transmission control unit 8 controls the power to be supplied from an external power source 100 to the power transmission coil 7. The power transmission control unit 8 includes a rectifier circuit 11, a DC/DC circuit 12, a DC/AC circuit 13, and a power transmission control circuit 14. The rectifier circuit 11 converts AC power from the external power supply 100 into DC power. The DC/DC circuit 12 controls the voltage and current of the DC power from the rectifier circuit 11. For example, the DC/DC circuit 12 boosts the DC power from the rectifier circuit 11.

The DC/AC circuit 13 converts the DC power from the DC/DC circuit 12 into AC power and supplies it to the power transmission coil 7. The power transmission control circuit 14 controls the DC/AC circuit 13 such that the AC power supplied to the power transmission coil 7 has a predetermined target frequency. The target frequency is, for example, a frequency value at which the power receiving coil 6 is able to resonate when the degree of coupling between the power transmission coil 7 and the power receiving coil 6 is a predetermined value. The power transmission coil 7 is electromagnetically coupled with the power receiving coil 6 to transmit the AC power supplied from the power transmission control unit 8 to the power receiving coil 6 through space.

The power receiving unit 3 includes a power receiving control unit 9. The power receiving control unit 9 is connected to the power receiving coil 6. The power receiving control unit 9 includes a variable capacity circuit 21, a rectifier circuit 22, a DC/DC circuit 23, and a power receiving control circuit 24. The variable capacity circuit 21 is connected to the power receiving coil 6. The variable capacitance circuit 21 and the power receiving coil 6 constitute a resonance circuit 25.

The variable capacitance circuit 21 changes the capacitance of the variable capacitance circuit 21 in response to a signal from the power receiving control circuit 24. Accordingly, the resonance frequency of the resonance circuit 25 changes. For example, the power receiving control circuit 24 increases the capacitance of the variable capacitance circuit 21 so as to decrease the resonance frequency of the resonance circuit 25. The power receiving control circuit 24 decreases the capacitance of the variable capacitance circuit 21 so as to increase the resonance frequency of the resonance circuit 25.

The rectifier circuit 22 converts the AC power from resonance circuit 25 into DC power. The DC/DC circuit 23 controls the voltage and current of DC power that is to be output to the load 5. The power receiving circuit 24 detects the output voltage and output current from the DC/DC circuit 23. The output voltage is the voltage of the output power that is to be output from the DC/DC circuit 23 to the load 5. The output current is the current of the output power. The power receiving circuit 24 controls the DC/DC circuit 23 to regulate the output voltage and output current to be output to the load 5. For example, the power receiving circuit 24 controls the DC/DC circuit 23 so that the output voltage is constant.

The power receiving circuit 24 detects an input voltage from resonance circuit 25. The input voltage is the voltage smoothed by the rectifier circuit 22. The power receiving circuit 24 controls the variable capacitance circuit 21 in response to the input voltage. The power receiving circuit 24 controls the variable capacitance circuit 21 in response to the input voltage so as to regulate the resonance frequency of the resonance circuit 25.

For example, when the input voltage is lower than a predetermined lower limit, the power receiving circuit 24 controls the capacitance of the variable capacitance circuit 21 so as to decrease the difference between the frequency of the power to the power transmission coil 7 and the resonance frequency of the power receiving coil 6. Thereby, when the input voltage increases, the transmission efficiency of the power from the power transmission coil 7 to the power receiving coil 6 increases. As a result, even when the degree of coupling between the power transmission coil 7 and the power receiving coil 6 is low, high efficiency of power transmission is maintained. That is, even if the positional deviation of the power receiving coil 6 with respect to the power transmitting coil 7 is large, the efficiency of power transmission is maintained high.

Figure 2:
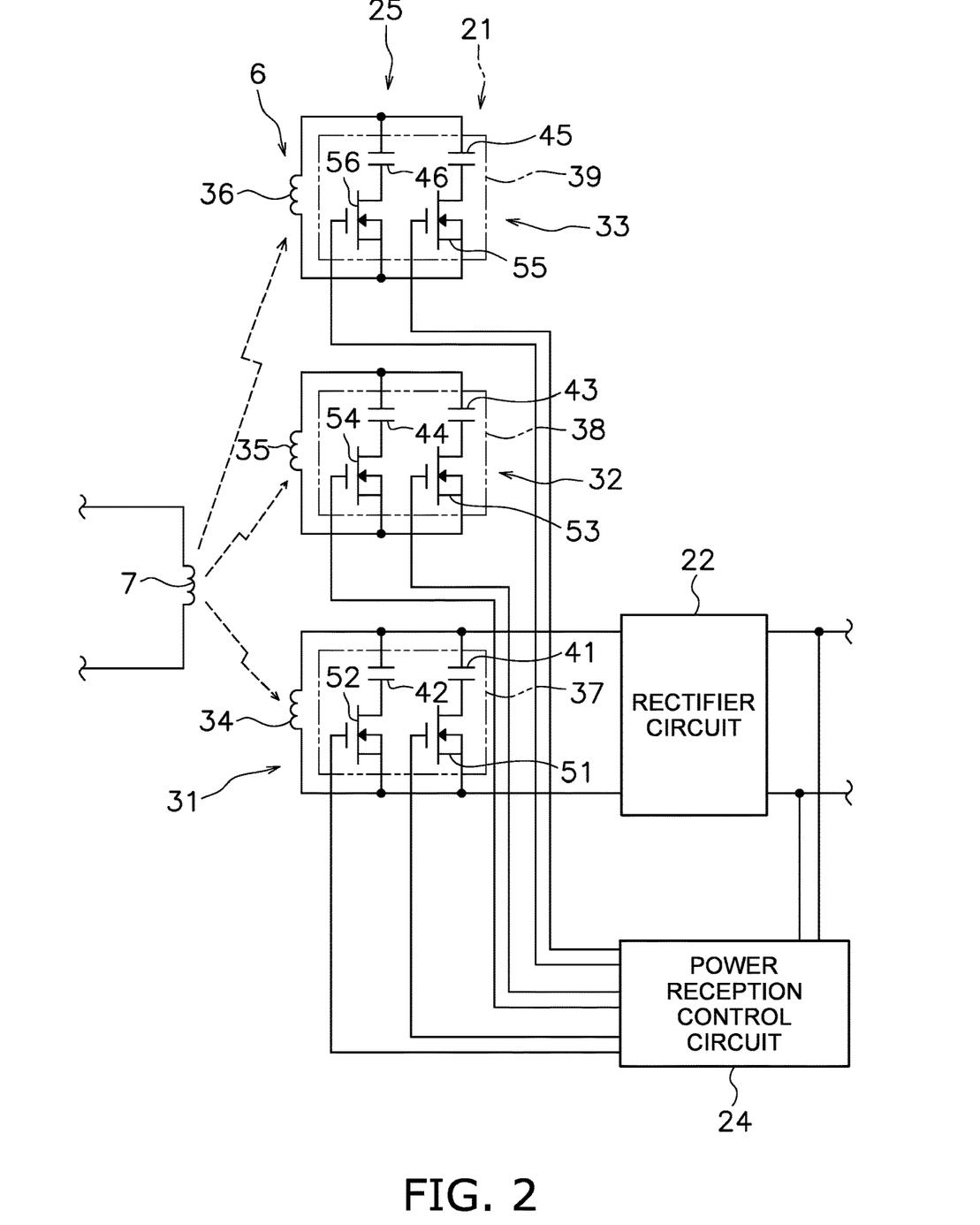
FIG. 2 is a diagram showing an example of a resonant circuit of a power receiving unit.

FIG. 2 is a diagram showing an example of the resonant circuit 25 of the power receiving unit 3. As shown in FIG. 2, the resonant circuit 25 includes a first resonant circuit 31, a second resonant circuit 32, and a third resonant circuit 33. The first resonant circuit 31 includes a first coil 34 and a first variable capacitance circuit 37. The first variable capacitance circuit 37 is connected in parallel to the first coil 34. The first variable capacitance circuit 37 includes a plurality of first resonant capacitors 41 and 42 and a plurality of first switching elements 51 and 52.

The first resonance capacitors 41 and 42 are connected in series with the first switching elements 51 and 52, respectively. The first resonance capacitors 41 and 42 and first switching elements 51 and 52 are connected in parallel to the first coil 34. The first switching elements 51 and 52 are, for example, n-channel MOSFETs. The first switching elements 51 and 52 each have a drain terminal connected to one end of the first coil 34 via first resonance capacitors 41 and 42, respectively. The first switching elements 51 and 52 each have a source terminal connected to the other end of the first coil 34. The first switching elements 51 and 52 each have a gate terminal connected to the power receiving circuit 24.

The second resonant circuit 32 includes a second coil 35 and a second variable capacitance circuit 38. The second variable capacitance circuit 38 includes a plurality of second resonant capacitors 43 and 44 and a plurality of second switching elements 53 and 54. The third resonant circuit 33 includes a third coil 36 and a third variable capacitance circuit 39. The third variable capacitance circuit 39 includes a plurality of third resonant capacitors 45 and 46 and a plurality of third switching elements 55 and 56. The second resonance circuit 32 and the third resonance circuit 33 have a configuration similar to that of the first resonance circuit 31, except that the first resonance circuit 31 is connected to the rectifier circuit 22. The second resonance circuit 32 and the third resonance circuit 33 each form a closed loop.

The first coil 34, the second coil 35, and the third coil 36 constitute the above-described power receiving coil 6. The first coil 34, the second coil 35, and the third coil 36 are arranged so as to be electromagnetically coupled to each other. For example, the first coil 34, the second coil 35, and the third coil 36 are concentrically arranged in proximity of each other.

The first variable capacitance circuit 37, the second variable capacitance circuit 38, and the third variable capacitance circuit 39 constitute the circuit 21. The power receiving circuit 24 controls the capacitance of the variable capacitance circuit 21 by tuning on and off a plurality of switching elements 51 to 56. For example, the power receiving circuit 24 is configured to increase the capacitance of the variable capacitance circuit 21 by increasing the number of the switching elements in the on state. Also, the power receiving circuit 24 is configured to decrease the capacitance of the variable capacitance circuit 21 by reducing the number of the switching elements in the on state.

Note that the configuration of the resonant circuit 25 of the power receiving unit 3 is not limited to the above and may be changed. For example, the number of the resonance circuits 25 is not limited to three. The number of the resonant circuits 25 may be less than three or more than three. The number of the switching elements is not limited to the above and may be changed. Some or all of the switching elements 51 and 52 in the first resonance circuit 31 may be omitted.

Figure 3:
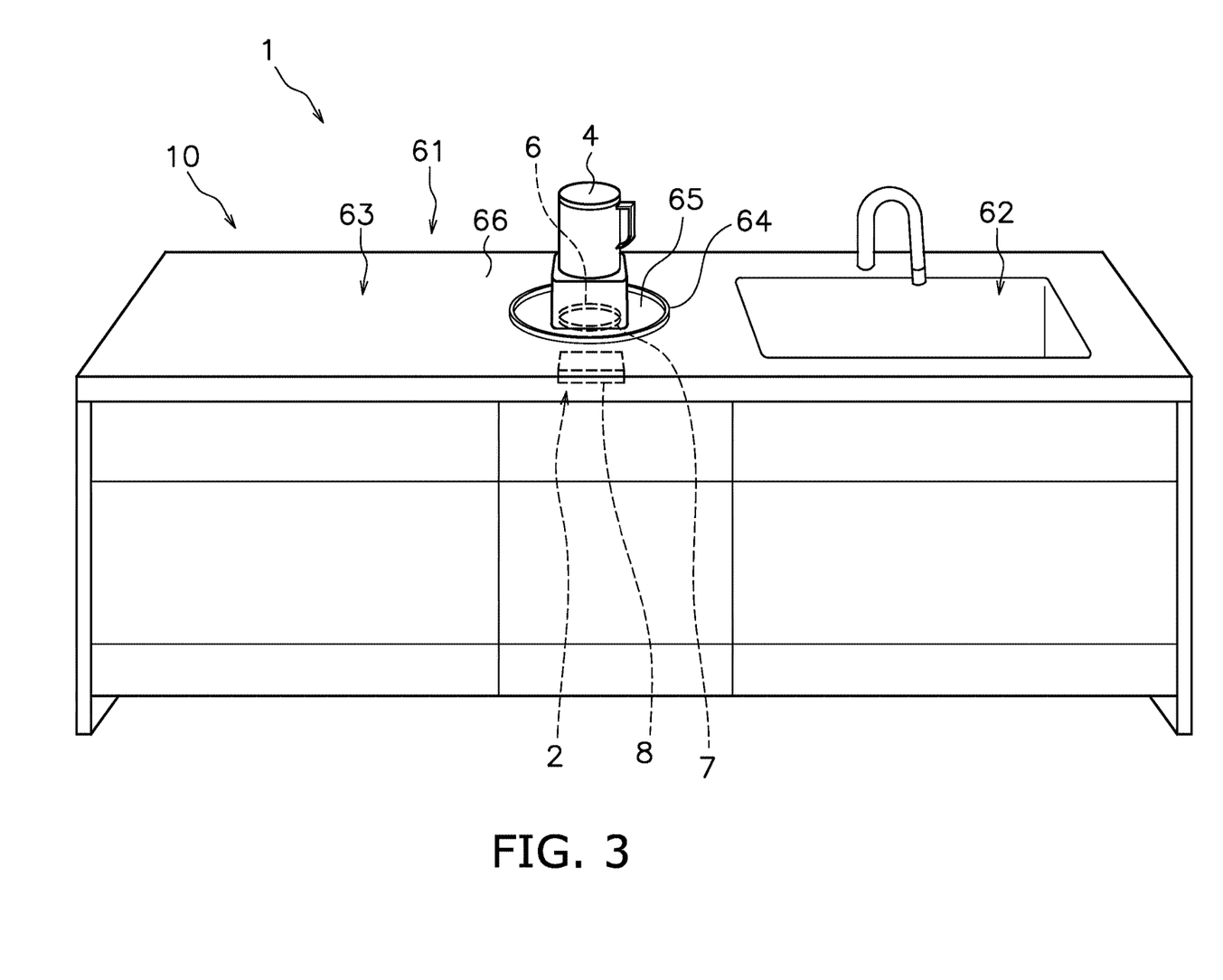
FIG. 3 is a perspective view showing an external configuration of the wireless power supply system.
Figure 4:
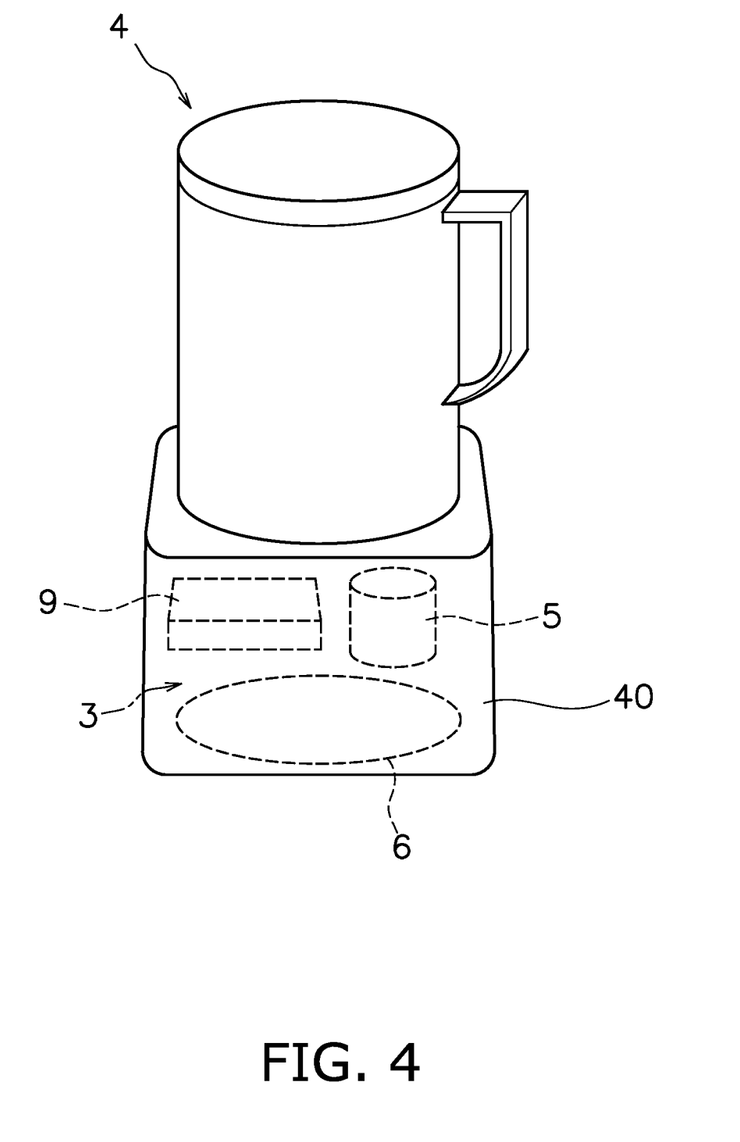
FIG. 4 is an enlarged view of an electrical device.

FIG. 3 is a perspective view showing an external configuration of the wireless power supply system 1. As shown in FIG. 3, the wireless power supply system 1 includes a kitchen counter 10 on which the electrical device 4 is arranged. FIG. 4 is an enlarged view of the electrical device 4. As shown in FIG. 4, the electrical device 4 includes the above-described power receiving unit 3 and the load 5. The power receiving coil 6 of the power receiving unit 3 is disposed, for example, in the bottom part 40 of the electrical device 4. The power receiving unit 3 supplies the power, which has been received by the power receiving unit 3 from the power transmitting unit 2, to the load 5.

The electrical device 4 may be, for example, a chopper, a food processor, a mixer, or a device such as a blender that uses drive power. In this case, the load 5 is a motor and is driven by power that the power receiving unit 3 has received. The load 5 may include a battery, and the battery may be charged with the power from the power receiving unit 3. The motor may be driven by power from the battery. Alternatively, the motor may be driven directly by the power from the power receiving unit 3, without battery. The electrical device 4 may be of a handy type or of a stationary type.

Alternatively, the electrical device 4 may be a device that uses heat such as a coffee maker, a toaster, a rice cooker, an air fryer, or an IH heater. In this case, the load 5 is a heater, and generates heat using the power that the power receiving unit 3 has received. The heater may generate heat with power from a battery. The heater may generate heat with power directly from the power receiving unit 3, without battery.

As shown in FIG. 3, the kitchen counter 10 includes a countertop 61. The kitchen counter 10 includes a sink 62. However, the sink 62 is not essential in the kitchen counter 10. The countertop 61 has a flat surface 63 on which the electrical device 4 is placed. The flat surface 63 has a standing portion 64. The standing portion 64 protrudes upward from the flat surface 63. The flat surface 63 includes a power supply surface 65 and a main surface 66. The power supply surface 65 is positioned inside the standing portion 64. The main surface 66 is positioned outside the standing portion 64. The power supply surface 65 is integral and flush with the main surface 66.

The above-described power transmitting unit 2 is disposed in the kitchen counter 10. The power transmission coil 7 is disposed below the flat surface 63. Specifically, the power transmission coil 7 is disposed below the power supply surface 65. The power transmission coil 7 is disposed in the countertop 61 and in proximity of the power supply surface 65.

The standing portion 64 defines the power supply surface 65 and the main surface 66 on the flat surface 63. That is, the standing portion 64 defines a boundary, on the flat surface 63, between the outside and the inside of the placement area for the electrical device 4 for supplying power from the power transmitting unit 2 to the power receiving unit 3 by the wireless power supply. The standing portion 64 is integral with the flat surface 63. However, the standing portion 64 may be a separate member from the flat surface 63. The standing portion 64 has a circular loop shape.

Figure 5:
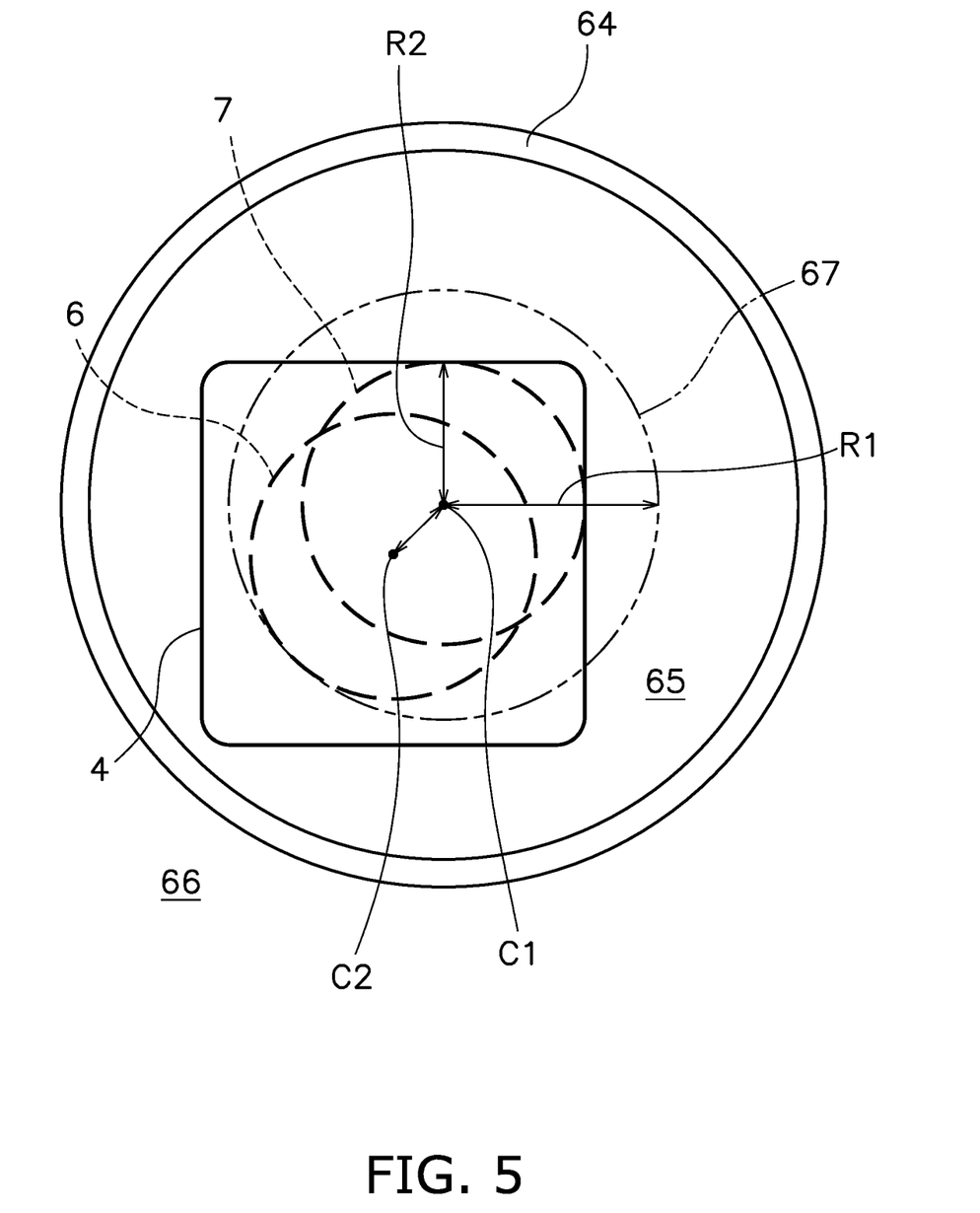
FIG. 5 is a top view showing an arrangement of a standing portion and a power transmission coil.

FIG. 5 is a top view showing the arrangement of the standing portion 64 and the power transmission coil 7. As shown in FIG. 5, the standing portion 64 is disposed to be wider than the power transmission coil 7, on the flat surface 63. The standing portion 64 is positioned, on the flat surface 63, outside a placement allowable area 67 for the power receiving coil 6 for supplying power from the power transmitting unit 2 to the power receiving unit 3 by the wireless power supply. While the external periphery of the power receiving coil 6 is placed within the placement allowable area 67, the efficiency of power transmission from the power transmitting unit 2 to the power receiving unit 3 remains at a predetermined threshold or higher.

The placement allowable area 67 is a range having a radius of a predetermined allowable distance R1 about the center C1 of the power transmission coil 7. The predetermined allowable distance R1 is greater than a radius R2 of the power transmission coil 7. The predetermined allowable distance R1 is 1.5 times the radius R2 of the power transmission coil 7, for example. In this case, the allowable length of misalignment between the center C1 of the power transmission coil 7 and the center C2 of the power receiving coil 6 is up to 0.5 times the radius R2 of the power transmission coil 7. However, the predetermined allowable distance R1 may be smaller or larger than 1.5 times the radius R2 of the power transmission coil 7. The predetermined allowable distance R1 is set such that the efficiency of power transmission from the power transmitting unit 2 to the power receiving unit 3 is an appropriate value or more.

The power supply surface 65 is wider than the placement allowable area 67. That is, the standing portion 64 is arranged so as to surround a wider range than the placement allowable area 67. The distance between the standing portion 64 and the placement allowable area 67 is determined based on the external size of the electrical device 4. For example, when the bottom part 40 of the electrical device 4 is placed on the power supply surface 65, the distance between the standing portion 64 and the placement allowable area 67 is determined based on the external size of the bottom part 40 of the electrical device 4.

The distance between the standing portion 64 and the placement allowable area 67 is set such that the bottom part 40 of the electrical device 4 does not interfere with the standing portion 64, when the power receiving coil 6 is positioned at any position within the placement allowable area 67. In other words, the distance between the standing portion 64 and the placement allowable area 67 is set such that the power receiving coil 6 is positioned within the placement allowable area 67, when the electrical device 4 is positioned at any position inside the standing portion 64. However, the distance between the standing portion 64 and the placement allowable area 67 may have a certain degree of margin.

The above wireless power supply system 1 according to the present embodiment supplies power to the electrical device 4 without a power cable. Thus, a user can use the electrical device 4 with no obstructive power cable. Moreover, replacement of the electrical device 4 is easy. Such configuration increases the user's comfort when using the electrical device 4.

In the wireless power supply system 1, no power cable is exposed on the countertop 61. As a result, high waterproofness can be obtained, enabling the electrical device 4 to be used around the sink 62.

When the electrical device 4 that is not equipped with a battery is used, if the electrical device 4 falls over, the power receiving coil 6 is separated from the power transmitting coil 7 and the power supply to the load 5 is stopped. Thereby, operation of the electrical device 4 can be stopped automatically.

The position of the external power source 100 for supplying power to the power transmitting unit 2 is not limited to the position where the electrical device 4 is used. Thus, the degree of freedom in installation of the external power source 100 is increased.

The standing portion 64 defines a boundary between the outside and the inside of the placement area for the electrical device 4 for the wireless power supply. Thus, compared to the case where the position of the power transmission coil 7 is illustrated, the user can easily grasp the range in which the electrical device 4 should be placed.

The standing portion 64 protrudes from the flat surface 63. With the configuration, when the electrical device 4 is not correctly placed in the placement area for the electrical device 4, the standing portion 64 raises the electrical device 4 above the flat surface 63. Therefore, the user can easily grasp whether or not the electrical device 4 is correctly placed in the placement area for the electrical device 4. In addition, the user does not have to care about the position of the power transmission coil 7, and can simply place the electrical device 4 inside the standing portion 64. As a result, without precisely alignment of the electrical device 4 with respect to the power transmission coil 7 by the user, sufficient efficiency of power transmission can be ensured therebetween.

One embodiment of the present invention has been described above, but the present invention is not limited to the above-described embodiment, and various modifications are possible without departing from the gist of the invention.

The circuit configuration of the wireless power supply system 1 is not limited to that of the above embodiment, and may be modified. For example, the configuration of the power receiving control unit 9 is not limited to that of the above embodiment, and may be changed. The configuration of the power transmission control unit 8 is not limited to that of the above embodiment, and may be modified.

The wireless power supply system 1 may be placed at elsewhere other than the kitchen counter 10. For example, the wireless power supply system 1 may be installed on a table, desk, workbench, or the like. The flat surface 63 may be mounted on the top surface of such a table, desk, or workbench.

Figure 6:
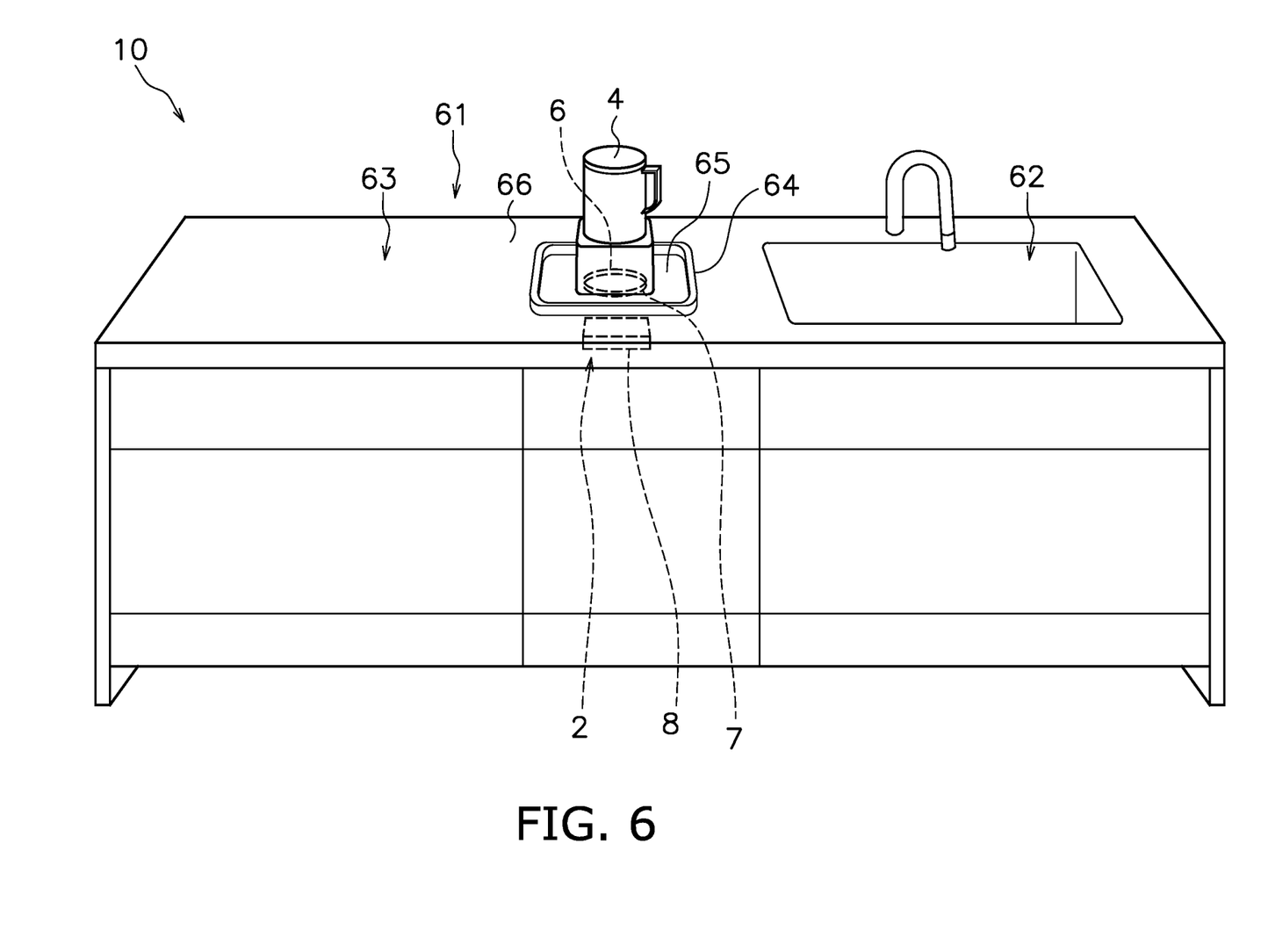
FIG. 6 is a perspective view showing a standing portion according to a modification.
Figure 7:
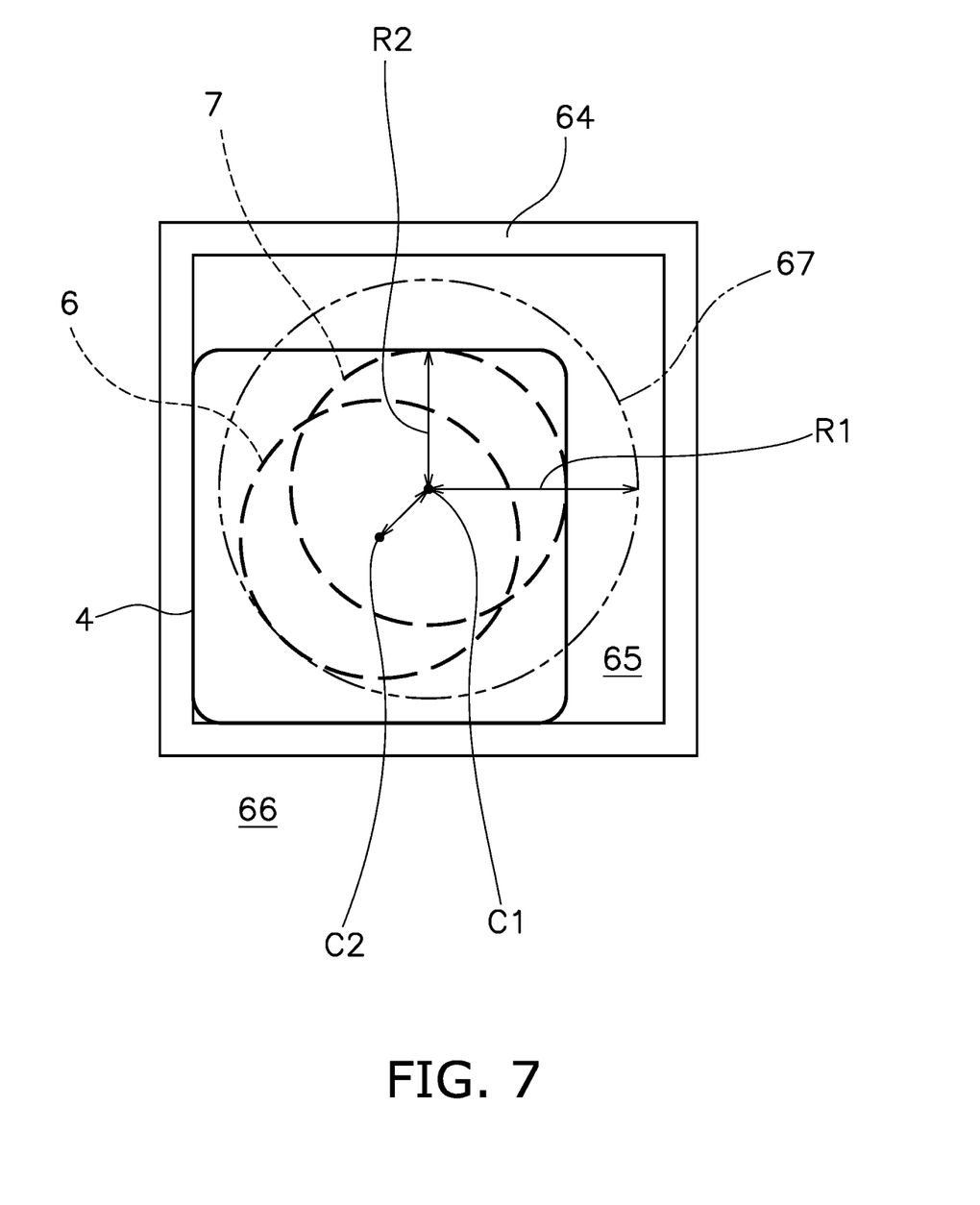
FIG. 7 is a top view showing an arrangement of a standing portion and a power transmission coil according to a modification.

The shape of the standing portion 64 is not limited to that of the above embodiment, and may be changed. For example, the standing portion 64 is not limited to be circular and may be elliptical. FIG. 6 is a perspective view showing the standing portion 64 according to a modification. FIG. 7 is a top view showing an arrangement of the standing portion 64 and the power transmission coil 7 according to a modification. As shown in FIGS. 6 and 7, the standing portion 64 may be polygonal, such as square.

The position of the power receiving coil 6 is not limited to the bottom part 40 of the electrical device 4, and the power receiving coil 6 may be installed at another position.

For example, in the case of a handy electrical device 4, the power receiving coil 6 may be installed in the top or a side part of the electrical device 4.

The electrical device 4 or the flat surface 63 may include an indicator. The indicator may display the degree of coupling between the power transmission coil 7 and the power receiving coil 6. Alternatively, the indicator may display the state of charge of a battery in the electrical device 4.

According to the present invention, sufficient efficiency of power transmission is ensured in a wireless power supply system without requiring a user for strict alignment between an electrical device and a power transmission coil.

REFERENCE SIGNS LIST

1 Wireless power supply system
2 Power transmitting unit
3 Power receiving unit
4 Electrical device
6 Power receiving coil
7 Power transmission coil
63 Flat surface
64 Standing portion
65 Power supply surface
66 Main surface
67 Placement allowable area

The invention claimed is:

1. A wireless power supply system configured to supply power to an electrical device by wireless power supply, the electrical device equipped with a power receiving unit including a power receiving coil, the wireless power supply system comprising:
   a flat surface on which the electrical device is placed;
   a power transmitting unit including a power transmission coil disposed below the flat surface, the power transmitting unit configured to supply power to the power receiving unit by the wireless power supply; and
   a standing portion protruding from the flat surface and defining, on the flat surface, a boundary between an outside and an inside of a placement area for the electrical device to supply power from the power transmitting unit to the power receiving unit by the wireless power supply,
   wherein the standing portion is disposed, on the flat surface, outside a placement allowable area for the power receiving coil to supply power from the power transmitting unit to the power receiving unit by the wireless power supply.

2. The wireless power supply system according to claim 1, wherein the standing portion surrounds the power transmission coil on the flat surface.

3. The wireless power supply system according to claim 1, wherein an efficiency of power transmission from the power transmitting unit to the power receiving unit is at or above a predetermined threshold while the power receiving coil is placed within the placement allowable area.

4. The wireless power supply system according to claim 1, wherein a distance between the standing portion and the placement allowable area for the power receiving coil is determined based on an external size of the electrical device.

5. The wireless power supply system according to claim 1, wherein
   the flat surface includes a power supply surface inside the standing portion and a main surface outside the standing portion, wherein
   the power supply surface is integral with the main surface.

6. The wireless power supply system according to claim 1, wherein the standing portion is integral with the flat surface.

7. The wireless power supply system according to claim 1, wherein the flat surface is mounted on a kitchen countertop.

8. A wireless power supply system comprising:
   an electrical device equipped with a power receiving unit, the power receiving unit including a power receiving coil;
   a flat surface on which the electrical device is placed;
   a power transmitting unit including a power transmission coil disposed below the flat surface, the power transmitting unit configured to supply power to the power receiving unit by wireless power supply; and
   a standing portion protruding from the flat surface and defining, on the flat surface, a boundary between an outside and an inside of a placement area for the electrical device to supply power from the power transmitting unit to the power receiving unit by the wireless power supply,
   wherein the standing portion is disposed, on the flat surface, outside a placement allowable area for the power receiving coil to supply power from the power transmitting unit to the power receiving unit by the wireless power supply.

9. The wireless power supply system according to claim 8, wherein the standing portion surrounds the power transmission coil on the flat surface.

10. The wireless power supply system according to claim 8, wherein an efficiency of power transmission from the power transmitting unit to the power receiving unit is at or above a predetermined threshold while the power receiving coil is placed within the placement allowable area.

11. The wireless power supply system according to claim 8, wherein a distance between the standing portion and the placement allowable area for the power receiving coil is determined based on an external size of the electrical device.

12. The wireless power supply system according to claim 8, wherein
   the flat surface includes a power supply surface inside the standing portion and a main surface outside the standing portion, wherein
   the power supply surface is integral with the main surface.

13. The wireless power supply system according to claim 8, wherein the standing portion is integral with the flat surface.

14. The wireless power supply system according to any one of claim 8, wherein the flat surface is mounted on a kitchen countertop.

\* \* \* \* \*